US006727601B2

(12) United States Patent
Rothfuss et al.

(10) Patent No.: US 6,727,601 B2
(45) Date of Patent: Apr. 27, 2004

(54) MOTOR VEHICLE HEADLIGHT WITH IGNITION DEVICE

(75) Inventors: Bernd Rothfuss, Schömberg (DE); Thomas Gross, Affalterbach (DE); Klaus Jahnel, Stuttgart (DE); Heinz Ruckwied, Kusterdingen (DE)

(73) Assignee: Automotive Lighting Reutlingen GmbH, Reutlingen (DE)

( * ) Notice: Subject to any disclaimer, the term of this patent is extended or adjusted under 35 U.S.C. 154(b) by 0 days.

(21) Appl. No.: 10/422,832

(22) Filed: Apr. 25, 2003

(65) Prior Publication Data

US 2003/0227218 A1 Dec. 11, 2003

(30) Foreign Application Priority Data

Apr. 30, 2002 (DE) ........................................ 102 19 175

(51) Int. Cl.$^{7}$ .................................................. B60Q 1/00
(52) U.S. Cl. ........................ 307/10.1; 307/157; 362/459
(58) Field of Search ............................... 307/10.1, 10.6, 307/112; 362/459, 494, 487, 507; 315/77

(56) References Cited

U.S. PATENT DOCUMENTS 5,869,907 A * 2/1999 Marler ...................... 307/10.1
2003/0057843 A1 * 3/2003 Kim ............................ 315/77

* cited by examiner

*Primary Examiner*—Gregory J. Toatley, Jr.
(74) *Attorney, Agent, or Firm*—Paul Vincent

(57) ABSTRACT

The invention concerns a motor vehicle headlight with an ignition device (3) for generating an ignition voltage for operating a light (4). The headlight has a safety device 1 for protection from injuries caused by electricity, wherein the ignition device (3) comprises a housing (5) for receiving the light (4) and an ignition switch which can be connected to the light (4) and terminals (6, 7) for electric connection of the ignition switch and the vehicle electrical system. The housing (5) can be mounted to a base plate (2). To improve safety of maintenance or mounting of the headlight, in particular to prevent injuries through contact with exposed electrically conducting parts where high voltages could be present, the use of a safety device 1 is proposed which is disposed on the base plate 2 and comprises means for mounting the housing 5, wherein the ignition device 3 can be connected to the vehicle electrical system via the safety device 1 only when the housing 5 is mounted.

13 Claims, 2 Drawing Sheets

MOTOR VEHICLE HEADLIGHT WITH IGNITION DEVICE

This application claims Paris Convention priority of DE 102 19 175.1 filed Apr. 30, 2002 the complete disclosure of which is hereby incorporated by reference.

BACKGROUND OF THE INVENTION

The invention concerns a motor vehicle headlight with an ignition device to generate an ignition voltage for operating an electric discharge lamp, and a safety device for protection from injuries caused by electricity, wherein the ignition device comprises a housing for accommodating the light, an ignition switch which can be connected to the light, and terminals for electrically connecting the ignition switch to the vehicle electrical system, wherein the housing can be mounted to a base plate.

Motor vehicle headlights of this type are known in the art. Operation of an electric discharge lamp (subsequently referred to as a light) requires the ignition device. When switched on, the ignition device subjects the light to an ignition voltage, which energizes the gas located in the light to emit light directly after being switching on.

Towards this end, the ignition device has an ignition switch, which generates the required high voltage when it is connected to the electrical system of the motor vehicle. The ignition switch is located in a housing and has terminals disposed on the housing for connection to the vehicle electrical system.

The housing also has a holder in which the light can be received and mounted. The holder is generally provided with contacts, which connect the mounted light to the ignition switch. To mount the ignition device with the light on the headlight, the housing can be mounted to a base plate disposed on the headlight.

DE 199 41 538 A1 describes such an ignition device, which comprises a safety device for protection against contact with electrically conducting leads during operation of the ignition switch.

Towards this end, the base of the light can be mounted in the holder on the housing. The holder and light have bayonet lock elements, which permit simple mounting of the light in the holder. The safety device comprises a lever, which cooperates with the bayonet lock elements of the light and the terminals on the housing such that the ignition device is separated from the vehicle electrical system when the light is removed from the housing. The terminals of the ignition switch on the housing are thereby separated from those of the power line on the vehicle electrical system side when the light is removed from the holder. Voltage is consequently removed from the contacts on the ignition switch.

This device is disadvantageous in that the ignition device can be connected to the vehicle electrical system and can be operated when the light base holds the bayonet lock in the closed position. The ignition device can therefore also be operated when the housing is not mounted to the reflector, although the device may cause injury should it be operated separated from the reflector. If the ignition device is switched on in this case, injuries may occur through contact with unprotected electrodes having electric voltage or due to the high operating temperatures of the light.

It is the underlying purpose of the invention to eliminate the above-mentioned disadvantages and, in particular, to provide a motor vehicle headlight with improved safety for maintenance or repair works.

SUMMARY OF THE INVENTION

To achieve this purpose, one inventive solution provides that the safety device is disposed on the base plate and has means for mounting the housing, wherein the ignition device can be connected to the vehicle electrical system via the safety device only when the housing is mounted. Advantageously, the electric connection of the ignition device to the vehicle electrical system can be effected only when the housing is disposed on the base plate.

The safety device produces the connection to the vehicle electrical system as soon as the housing is disposed on the base plate. This prevents the ignition device and optionally the light mounted in the housing from being operated outside of the headlight reflector. Injuries during work on the headlight can thereby be prevented as could be caused by electric voltage or high temperatures during operation of the light.

The ignition device and/or the light cannot be touched when the housing is mounted and the safety device interrupts connection to the vehicle electrical system when the housing is removed from the base plate. Exposed parts which may have dangerous electric voltages when the ignition device is connected such as e.g. electrodes on the light or elements on the base or on the holder are always separated from the vehicle electrical system when the housing is not installed, since the safety device interrupts the electric connection when the ignition device is removed from the base plate. This eliminates danger from high voltage on the ignition device, since operation of the ignition device is not possible in this case.

Advantageously in accordance with the invention, there is no need for additional protection for the light, the holder or for the contacts connecting the light to the vehicle electrical system, since the light can be exchanged only when the housing has been removed from the base plate thereby separating the ignition device and light from the vehicle electrical system.

Injuries caused by the operating temperatures on the light can be largely prevented, since the light cannot be operated outside of the reflector. This advantageously improves safety.

If the housing of the ignition device is removed from the base plate e.g. for maintenance thereby permitting possible contact with the electrically conducting parts, the electric connection to the vehicle electrical system is immediately interrupted through removal of the housing from the base plate.

In a further inventive development, the safety device comprises a connection piece disposed on the base plate for connection to a power line on the vehicle electrical system side and for receiving the terminals connected therewith which contact the terminals on the housing when the housing is mounted in a plugging position. The connection piece permits simple mounting of the terminals on the vehicle electrical system side, which are connected to the power line, to the base plate. Advantageously, the terminals on the vehicle electrical system side are fixed by the connection piece when the housing is removed from the base plate and the ignition device thereby separated from the vehicle electrical system. During mounting, the housing is disposed on the base plate such that the terminals on the connection piece come into contact with those on the housing. The ignition device or housing are thereby connected to the vehicle electrical system and may be operated when the housing abuts the base plate.

When the housing is disposed on the base plate, the electrically conducting parts are shielded from contact in an electrically protective manner. Contact with these parts is therefore prevented when the high voltage can be generated by the ignition switch and could consequently be present on some of the electrically conducting parts.

In an advantageous embodiment, the terminals comprise a plug-socket-arrangement, preferably a supply plug connected to the connection piece, which engages a corresponding socket on the housing for generating the electric connection. The terminals are thereby securely mounted in both the connection piece and in the housing and are preferably respectively integral therewith.

The invention provides for arrangement of the plug and socket such that they engage one another when the housing is disposed on the base plate in a plugging position. The housing can be rapidly and easily mounted and the design of the safety device is independent of the housing mounting.

The invention provides a supply plug integrated in the connection piece which is held by the connection piece on the base plate when the housing is removed from the base plate and the plug and socket are separated thereby interrupting the electric connection.

Advantageously, the plug and power line cannot be lost in the motor compartment of the vehicle during maintenance and mounting since they remain fixed to the connection piece and therefore to the base plate.

Arrangement of the power line at the vehicle electrical system side on the connection piece and its disposition on the base plate avoids the need for introducing the power line to the housing of the ignition device. The ignition device and housing can be compact, thereby advantageously gaining space in the front region of the vehicle.

The power line can thereby be guided on the reflector and the base plate can be sideward displaced from the cable bundle of the vehicle. A cable conduit may be provided on the connection piece through which the power line can be passed to the terminals on the connection piece at the vehicle electrical system side.

In one advantageous embodiment of the invention, the base plate is preferably formed in one piece and has an opening for insertion of the light on the rear side of the headlight reflector. The base plate thereby serves as the reflector rear wall. The base plate has an opening through which the light can be inserted when the housing is mounted. The opening is preferably disposed in the region of the optical axis of the reflector. This advantageously allows for compact construction of the headlight.

The invention further permits the housing to be disposed on and mounted to the base plate in one single motion, preferably through rotation about the optical axis of the reflector using a bayonet connection. This embodiment provides for a structure with which the ignition device and the light can be mounted to the reflector in a simple and inexpensive fashion. The housing is disposed on the rear side of the reflector for mounting and the light mounted thereto is passed through the opening to the optically active side of the reflector. At the same time, the terminals are connected and provide for the electrical contact between the ignition device and the vehicle electrical system. The ignition device is mounted with its housing to the base plate in one rotational motion, preferably about the optical axis of the reflector and defines a bayonet lock. For removal, the housing is turned in the opposite direction until it is released from the bayonet lock elements and can be removed from the base plate to separate the terminals.

Towards this end, the connection piece is movably guided in a guide on the base plate and securely held by holding means, preferably cams. In a preferred fashion, the guide on the base plate holds the connection piece when the housing is removed. The holding means prevent removal of the connection piece from the guide and the supply terminals remain connected when the housing is removed from the base plate.

During mounting of the housing on the base plate, the connection piece is moved in the guide in the turning direction of the housing. The invention thereby provides that the connection piece moves in the holding means in correspondence to the rotation during mounting of the housing. The guide is thereby fashioned such that the connection piece can be displaced in the guide by the housing.

The connection piece is thereby guided on the base plate, preferably about the optical axis of the reflector such that the terminals on the housing and on the connection piece remain fixed relative to each other and remain connected during mounting.

The terminals on the vehicle electrical system side are thereby connected to the connection piece with a movable and flexible power line such that the connection piece is held in the guide in a freely movable fashion.

Moreover, the holding means are designed to hold the connection piece in a mounting position when the housing is mounted and in a plugging position when the housing is removed. When the housing is mounted to the base plate it is held by the connection piece in a mounted position. The light is thereby fixed in the opening at a predetermined operating position. When the housing is dismounted and removed from the base plate, the connection piece remains arrested in the plugging position, preferably via cams. The terminals on the vehicle electrical system side remain in a predetermined position on the base plate via the connection piece i.e. in the plugging position and do not have to be repositioned for renewed mounting of the housing. The terminals can easily mutually engage when the housing is disposed on the base plate.

The invention permits construction of a motor vehicle headlight using a simple arrangement of the components, which can be mounted during production and maintenance in an inexpensive and safe fashion.

The invention is explained below with reference to the drawings.

DESCRIPTION OF THE PREFERRED EMBODIMENT

Figure 1:
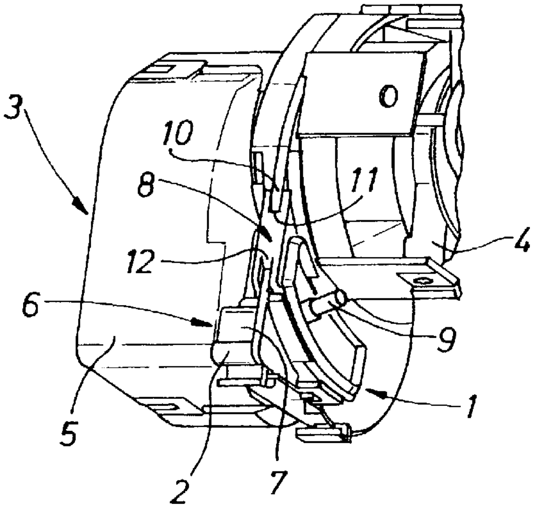
FIG. 1 shows a perspective side view of the ignition device mounted to the base plate with safety device.

FIG. 1 shows a perspective side view of the safety device 1 with ignition device 3 mounted to the base plate 2.

The base plate 2 is provided for mounting to a reflector of a motor vehicle headlight. The light 4 is thereby connected to the base plate 2 and the ignition device 3.

The ignition device 3 has a housing 5 in which an ignition switch is disposed. Terminals 6 are provided on the housing, which are connected to corresponding terminals 7 of the vehicle electrical system in the region of the base plate 2.

The base plate 2 has a connection piece 8, which receives the terminals 7 on the vehicle electrical system side and is movably guided on the base plate 2. The connection piece 8 has a cable conduit 9 in which a power line cable, connected to the vehicle electrical system, is connected to the terminals 7. The power line cable is not shown in the drawing.

The connection piece 8 is guided in a guide 10 and is located in the mounting position on the base plate 2. The guide 10 is formed on the base plate 2 and the connection piece 8 as a tongue and groove joint. The connection piece 8 has grooves 11 which correspond to the recess elements 12 on the base plate 2.

Figure 2:
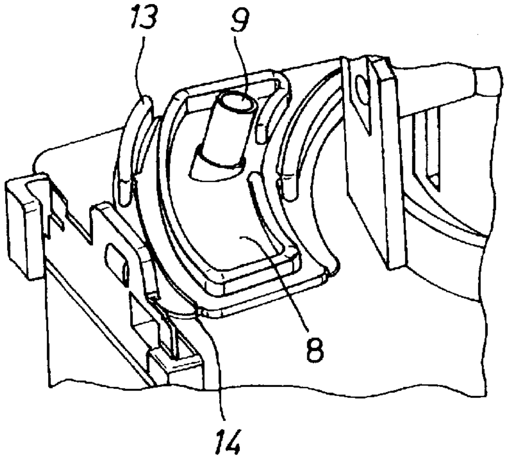
FIG. 2 shows a perspective top view of the connection piece in the mounting position on the base plate.

FIG. 2 shows a connection piece 8 corresponding to FIG. 1 in the mounting position. The connection piece 8 is thereby received in the guide 10 on the base plate. The guide 10 and the connection piece 8 have corresponding holding means 13, 14. The connection piece 8 is secured on the base plate by the holding means 13, 14 in the mounting position. Towards this end, the housing 5 of the ignition device 3, which is connected to the connection piece 8 via the terminals 6, 7 is secured on the base plate 2. The housing 5 preferably has a recess 15 for accepting a receptacle 16 of the connection piece 8 for the terminals 7 on the vehicle electrical system side which projects into the housing 5. The housing 5 is mechanically coupled to the connection piece 8 via the recess 15 and the receptacle 16 such that motion of the housing 5 produces a corresponding motion of the connection piece 8 in the guide 10 on the base plate.

Figure 3:
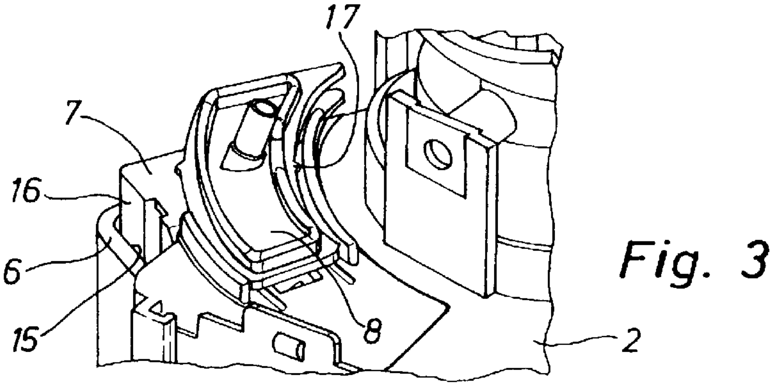
FIG. 3 shows a perspective top view of the connection piece during displacement in the guide on the base plate.

FIG. 3 shows the connection piece 8 with housing 5 in the plugging position. The connection piece 8 is arrested on the base plate 2 via cams 17. The cam 17 on the connection piece 8 is locked on corresponding holding means 13 on the base plate 2 and holds the connection piece 8 against displacement in the guide 10 in the plugging position.

Figure 4:
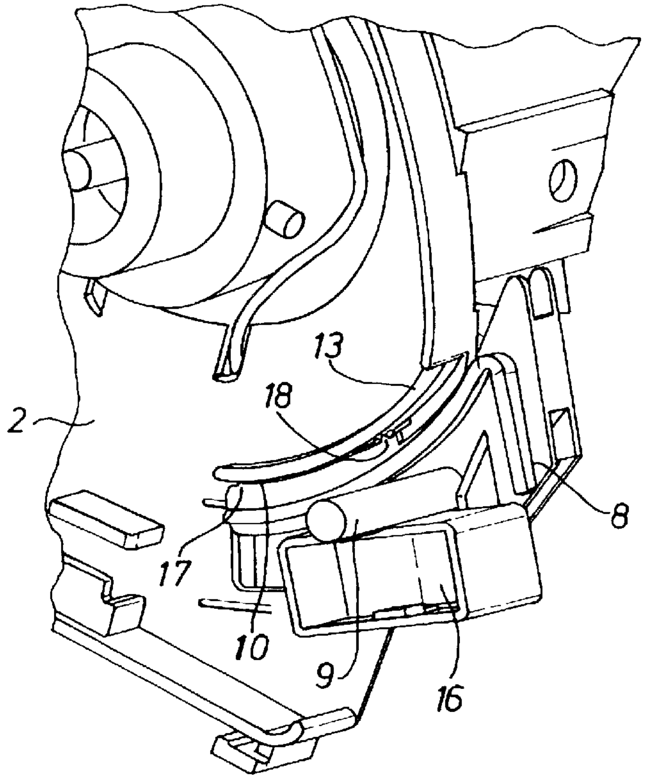
FIG. 4 shows the perspective view of FIG. 3 from below.

FIG. 4 shows the connection piece 8 without housing 5 in accordance with FIG. 3. The connection piece 8 has the receptacle 16 in which the terminals 7 can be mounted along with the power line on the vehicle electrical system side. The terminals and the power line are not shown. The receptacle 16 is connected to the cable conduit 9 in which the power line is guided at the connection piece 8 to the terminals 7. The connection piece 8 is held in the plugging position on the guide 10 by holding means 13 and by cams 17.

Figure 5:
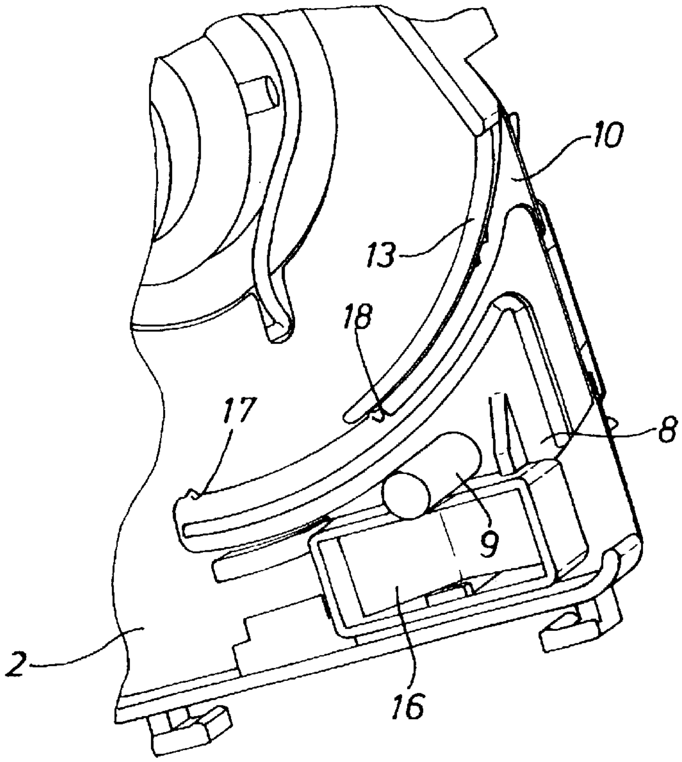
FIG. 5 shows the perspective view of FIG. 2 from below.

FIG. 5 shows the base plate 2 with connection piece 8 corresponding to FIG. 4 in the mounting position. The holding means 14 on the housing 5 correspond to the cams 18 on the connection piece 8 such that the connection piece 8 is secured against motion in the guide 10.

When the housing 5 of the ignition device 3 is mounted on the base plate 2, the connection piece 8 is initially in the plugging position. The holding means 13 correspond to the cams 17. The terminals 7 accommodated in the receptacle 16 engage the terminals 6 on the housing 5 and mounting elements (not shown) on the housing 5 are connected to the base plate 2. Subsequent rotation of the housing 5 on the base plate 2 secures the housing 5 to the base plate 2 via a bayonet lock. The connection piece 8 is thereby moved from the plugging position into the mounting position. Towards this end, the holding of the connection piece 8 in the plugging position can be overcome by holding means 13 and cams 17. To mount the housing 5 on the base plate 2, the housing 5 is rotated into the mounting position and the connection piece 8 is also moved into that mounting position thereby overcoming the holding means 14 and is held there by the cam 18.

To remove the housing 5 from the base plate 2, the connection piece 8 is correspondingly removed from the mounting position, wherein the holding means 14 or the cam 18 can be overcome.

When the housing 5 is disposed onto the base plate 2 for mounting, the terminals 6, 7 engage in proper electrical contact. When the housing 5 is disposed onto the base plate 2, neither the terminals, the contacts for the light, nor the light itself can be touched.

The ignition device 3 in accordance with the invention cannot be operated when it has been removed from the base plate 2.

In accordance with the invention, the safety device 1 can be used in an embodiment of the headlight with which the light is mounted to the base plate 2 before the ignition device 3 is disposed. In another embodiment, the light is first mounted on the housing 5 of the ignition device 3 and then mounted to the base plate 2 together with the housing 5.

In both embodiments, the terminals 6, 7 on the housing 5 and on the connection piece 8 engage such that the electrical connection to the vehicle electrical system and operation of the ignition device 3 and the light is possible as soon as the housing 5 is disposed on the base plate 2 but connection is interrupted when the housing 5 is not mounted to the base plate 2.

After the housing 5 is mounted on the base plate 2, the light 4 assumes a predetermined position at the optically active side of the reflector.

The invention permits the base plate 2 to be connected to the rear side of the reflector. Alternatively, the base plate is formed in one piece with the reflector to thereby reduce the number of components required for the headlight.

We claim:

1. A motor vehicle headlight system for connecting an ignition device to a light, the system having a safety mechanism for protection against injuries caused by electricity and heat, the ignition device generating an ignition voltage and having an ignition switch for applying the ignition voltage to the light to operate the light, the ignition device also having terminals for electric connection of the ignition switch to a vehicle electrical system, the head light connection system comprising:

a base plate;

a housing for receiving the ignition device and the light; and a safety device disposed on said base plate, said safety device comprising means for mounting said housing, said safety device structured to connect the ignition device to the vehicle electrical system only when said housing engages said mounting means.

2. The motor vehicle headlight connection system of claim 1, wherein said housing, said base plate, and said safety device are structured to prevent physical contact with the ignition device and the light when said housing is mounted, and wherein said safety device interrupts connection of the ignition device to the vehicle electrical system during removal of said housing from said mounting means.

3. The motor vehicle headlight connection system of claim 1, wherein said safety device comprises a connection piece disposed on said base plate for connection to a power line on a vehicle electrical system side and having a receptacle for connection piece terminals, said connection piece terminals communicating with the power line and contacting the ignition device terminals when said housing is mounted to said mounting means in a plugging position.

4. The motor vehicle headlight connection system of claim 3, wherein said connection piece terminals generate a plug-socket connection to said housing.

5. The motor vehicle headlight connection system of claim 4, wherein said connection piece comprises a plug of said plug-socket connection and said housing defines a socket of said plug-socket connection.

6. The motor vehicle headlight connection system of claim 1, wherein said base plate is formed in one piece and defines an opening for insertion of the light for introducing the light at a rear side of a headlight reflector.

7. The motor vehicle headlight connection system of claim 6, wherein said housing and said base cooperated to form a bayonet lock.

8. The motor vehicle headlight connection system of claim 7, wherein said housing is mounted to said base by rotating said housing substantially about an optical axis of the headlight reflector.

9. The motor vehicle headlight connection system of claim 3, wherein said base plate defines a guide having holdings means and cooperating with said connection piece for holding and guiding said connection piece.

10. The motor vehicle headlight connection system of claim 9, wherein said connection piece comprises cams cooperating with said holding means to secure said connection piece at defined locations about said guide.

11. The motor vehicle headlight connection system of claim 3, wherein said connection piece moves in said guide between said holding means in correspondence with a rotation during mounting of said housing to said base plate.

12. The motor vehicle headlight connection system of claim 9, wherein said holding means hold said connection piece at a mounting position in a mounted state of said housing and in a plugging position when said housing is removed.

13. An ignition device system for a motor vehicle headlight the ignition device having a safety mechanism for protection against injuries caused by electricity and heat, the ignition device generating an ignition voltage to operate a light, the ignition device comprising:

an ignition switch for applying the ignition voltage to the light;

terminals for electric connection of said ignition switch to a vehicle electrical system;

a base plate;

a housing for receiving said ignition switch, said terminals and the light; and a safety device disposed on said base plate, said safety device comprising means for mounting said housing, said safety device structured to connect said ignition device to the vehicle electrical system only when said housing engages said mounting means.

* * * * *